US006804774B1

(12) United States Patent
Larvoire et al.

(10) Patent No.: US 6,804,774 B1
(45) Date of Patent: Oct. 12, 2004

(54) SOFTWARE IMAGE TRANSITION AID COMPRISING BUILDING A DISK IMAGE BASED ON IDENTIFIED HARDWARE

(75) Inventors: Jean-Francois Larvoire, Meylan (FR); Francois-Xavier Lecarpentier, Sassenage (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 521 days.

(21) Appl. No.: 09/630,754

(22) Filed: Aug. 2, 2000

(30) Foreign Application Priority Data

May 12, 2000 (EP) ............................................ 00410050

(51) Int. Cl.[7] .............................................. G06F 9/445
(52) U.S. Cl. ........................... 713/2; 717/174; 717/175
(58) Field of Search ................................ 713/1, 2, 100; 703/23

(56) References Cited

U.S. PATENT DOCUMENTS

| | | | | |
|---|---|---|---|---|
| 5,555,416 A | * | 9/1996 | Owens et al. ................ | 717/178 |
| 5,604,906 A | * | 2/1997 | Murphy et al. ............. | 717/162 |
| 5,835,777 A | * | 11/1998 | Staelin ........................ | 717/175 |
| 5,870,610 A | * | 2/1999 | Beyda ......................... | 717/173 |
| 5,978,590 A | * | 11/1999 | Imai et al. .................... | 717/177 |
| 6,304,965 B1 | * | 10/2001 | Rickey ........................... | 713/2 |
| 6,449,682 B1 | * | 9/2002 | Toorians ..................... | 711/100 |
| 6,466,972 B1 | * | 10/2002 | Paul et al. ................... | 709/222 |

FOREIGN PATENT DOCUMENTS

| | | | |
|---|---|---|---|
| EP | 0965915 A2 | * | 12/1999 |

OTHER PUBLICATIONS

Raza et al., "Networking configuration with plug–and–play components", Dept. of Syst. & Comput. Eng., Carleton Univ., Ottawa, Ont.; Intergrated Network Management, 1999. Distributed Management for the Networked Millennium. On pp.: 937–938. 01999.*
"AlohaBob's PC–Relocator" User Manual v1.2, Eisenworld, Copyright 1999, pp. 1–28.
"Disk Cloning Technology for the Overburdened IT Professional", Symantec Paper Series, vol. XIIII, Symantec Corp., Copyright 1998, pp. 1–14.

* cited by examiner

*Primary Examiner*—Thomas Lee
*Assistant Examiner*—Eric Chang (57) ABSTRACT

A software image transition aid is described for acting on a software image that is transferred from a source computer to a target computer, the aid comprising: a bootable storage media with stored thereon one or more operating systems arranged to load when the target computer is booted from the storage media and program code elements arranged to modify the cloned disk image under the control of the operating system or systems, so that when the target computer is rebooted from the transferred image the target computer will reach an operational state. The tool can be used in the following way. First the user transfers the complete operational software image from the target PC onto a source PC. Then, before being booted from the cloned image, the target computer is booted from the image transition aid. The image transition aid acts on the software image stored on the hard disk in the target computer. Once the process in completed the target computer is rebooted to load the operating system that was transferred with the software image.

22 Claims, 4 Drawing Sheets

SOFTWARE IMAGE TRANSITION AID COMPRISING BUILDING A DISK IMAGE BASED ON IDENTIFIED HARDWARE

FIELD OF THE INVENTION

The present invention relates to computers and, more particularly, to a software tool for assisting a computer user in converting a software image operational on a source personal computer for use on a target personal computer.

BACKGROUND OF THE INVENTION

Usually personal computers are supplied by their manufacturer with an operating system and certain application programs already installed on the hard disk. However, many computer users wish to install their own custom image, or retain the working environment from their old PC, but face the problem that building a software image like this for use with a new personal computer can be very time consuming. The same issue is faced by potential purchasers of computers who first wish to test a new model with the production environment or applications used for instance throughout a large company.

The task of recreating the computing environment will generally involve a user installing the operating system, then all their desired applications. Finally the user must copy all their data files from wherever they are stored. At best, this process will take several hours. However, if it is unsuccessful, the problems can be difficult to diagnose and resolve.

Specialised transfer applications, such as the "Alohabob's PC Relocator" product available from Eisenworld Corp, do exist for copying applications and data from an old PC to the new one. However, these applications are generally not ideal, primarily because of the difficulty of distinguishing user applications from operating system accessories. Since the old and new PC often do not have the same operating system version, the resulting configuration can be unstable, with old operating system files overwriting newer ones already present on the new PC.

Disk cloning applications, such as the Norton Ghost Application available from Symantec Corporation, are also widely used, but these face the problem that the new PC will usually be made up of different hardware components and therefore the correct drivers for the new hardware components will need to be installed from somewhere. Since the hardware components of the new PC may not have existed when the old PC was bought, the correct drivers may not be present on either the hard disk of the old PC or whatever accompanying support media were supplied with it. The drivers for the new hardware will therefore have to be obtained from elsewhere.

Using this disk cloning approach, it has been found (i) that conflicts can occur when a new version of a driver is installed when in fact an older driver is already present on the disk and (ii) that configuration settings, such as the computer name, TCP/IP settings and the like are lost so that the drivers need to be reconfigured, which takes time and requires the necessary settings to be known by the person carrying out the operation.

The complexity of modern PC systems means that these kind of versioning and hardware conflicts are hard to avoid, particularly given the likelihood that some or all of the software components will, to a greater or lesser extent, contain bugs.

The present invention is directed to speeding up and easing generally the migration of a software environment from a source computer to a target computer.

SUMMARY OF THE INVENTION

In brief, this is achieved by a software image transition aid for acting on a software image that is transferred from a source computer to a target computer, the aid comprising: a bootable storage media with stored thereon one or more operating systems arranged to load when the target computer is booted from the storage media and program code elements arranged to modify the cloned disk image under the control of the operating system or systems, so that when the target computer is rebooted from the transferred image the target computer will reach an operational state.

In preferred embodiments, the program code elements can be arranged to: identify the hardware of the target computer; analyse the software image on the hard disk; identify files to be added to the transferred image; and copy the identified files from a repository to the transferred image, whereby when the target computer is rebooted from the transferred image, an operating system therein finds the required files.

This kind of tool can be used in the following way. First the user transfers the complete operational software image from the target PC onto a source PC either by using a suitable cloning tool of which there are several commercially available, or by physically removing the disk drive containing the software image from the source computer and fitting it into the target computer.

Then, before being booted from the cloned image, the target computer is booted from the image transition aid. The image transition aid acts on the software image stored on the hard disk in the target computer to at least add any necessary files, for instance missing drivers. In preferred embodiments, other operations are performed at this stage also, for instance drivers that are already present in the image may be removed in order to ensure a clean installation of the new drivers.

Once the process in completed the target computer is rebooted to load the operating system that was transferred with the software image. The operating system finds all the files necessary for it to be operational on the target computer, and is able to boot.

The invention is based, at least in part, on consideration of the problems encountered using the known methods of disk image migration. It has been found that adding support for the target hardware is an important issue and that by adding this support before the operating system image is booted on the target machine for the first time, it is possible to prevent numerous error messages, and avoid the user having to manually respond to lots of questions that would be generated by the operating system when discovering new hardware or installing new drivers.

BRIEF DESCRIPTION OF THE DRAWINGS

Software tools embodying the invention will now be described, by way of non-limiting example, with reference to the accompanying diagrammatic drawings, in which.

BEST MODE OF CARRYING OUT THE INVENTION

In the following, two embodiments will be described for use with the Microsoft Window 95 and NT4 operating systems respectively. It will be understood that the same approach may also be used with other operating systems, such as Linux, the problems described being generally associated with the need to quickly and conveniently convert a software disk image that is operational in a source computer for use in a target computer in circumstances where the source and target computers have different hardware configurations and where the necessary drivers for the target hardware may not have been available when the source PC was manufactured or configured so that it would have been impossible to supply them with the software delivered with the source computer.

These kinds of tools are used in the following way. First the user transfers the complete operational system image from the target PC onto a source PC either by using a suitable cloning tool or by physically removing the disk drive containing the software image from the source computer and fitting it into the target computer. Then, before booting the target computer from the cloned disk, the system is booted from a separate bootable media to load an operating system contained on the bootable media. Suitable programs also contained on the bootable media are then executed and serve to modify the cloned image so that it will boot successfully and result in an operational system In these embodiments, the software described is all contained in a single bootable CD-ROM, although it will be understood that any form of bootable storage media may equally be used. When the CD-ROM is inserted in the CD drive of the target PC, an OS contained on the disk is launched. Once the OS is launched, software also contained on the CD is run under that operating system to analyse and make changes to the software image.

Figure 1:
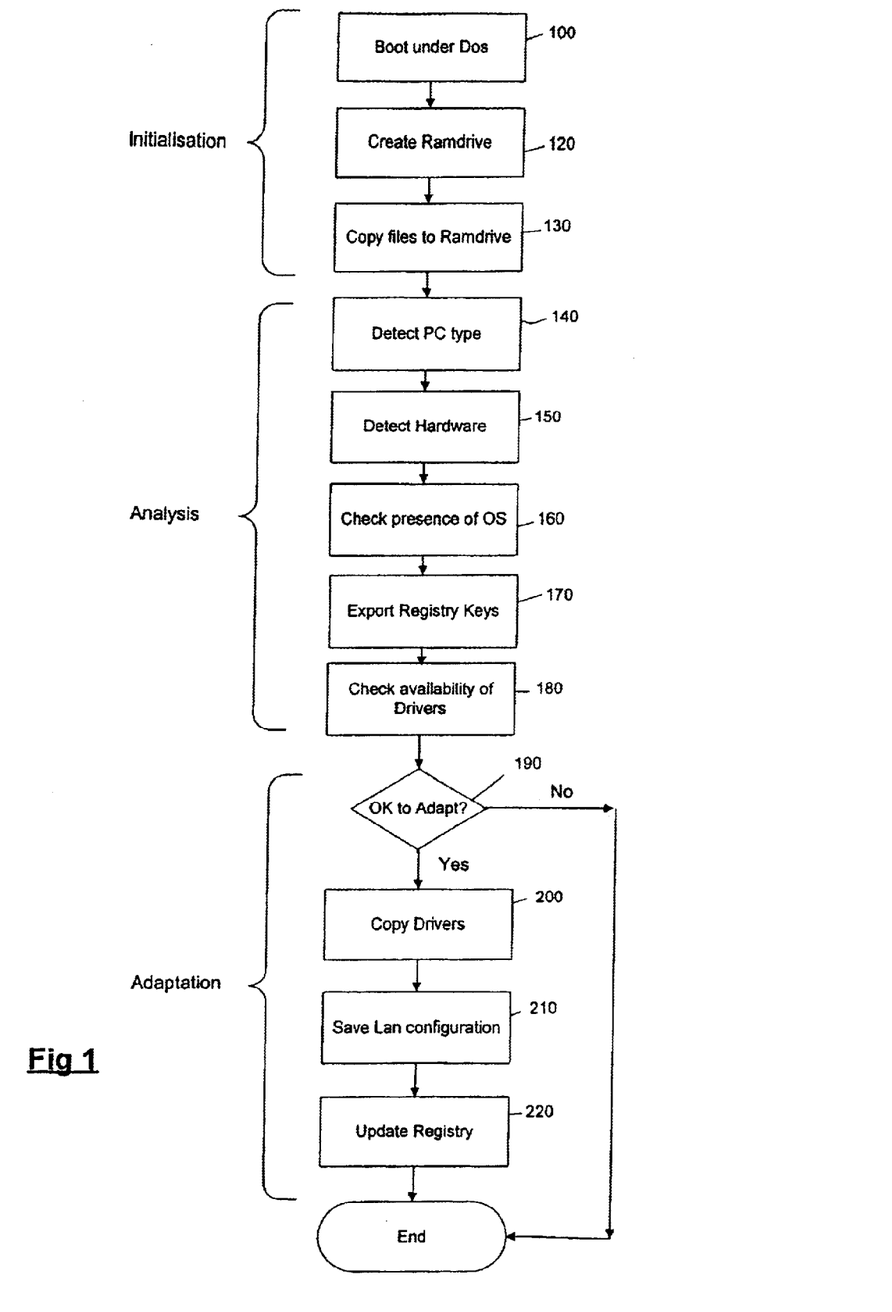
FIG. 1 is a flow diagram showing the main steps of operation of a software tool for use with Windows 95 software images.

FIG. 1 is a flow diagram showing the main steps of operation of the software tool in an embodiment of the invention for use with Windows 95. In this embodiment, the OS first launched from the CD is a version of the well known DOS operating system. The first step of the process is therefore the booting of the DOS operating system, shown as step 100.

At the launch, various options and parameters such as directory paths, the environment size and like parameters, are initialised and a progress bar is displayed on the screen. In addition, a RAM drive is created—step 120—that will be used to store various temporary files that are generated during the transition process. As is well-known, a Ramdrive is a portion of RAM that has been configured to simulate a disk drive. Files on a RAM disk can be accessed in the same way as files on a real disk drive. Certain files, such as the xcopy program and font files, are copied from the CD to the RAM drive for more efficient operation—step 130.

When the initialisation is finished, a welcome screen is displayed to the user (step not shown in FIG. 1) to inform them of the function of the software and warn them of the possible risks of its use, since the changes made to the software image by the tool will be irreversible.

Following the initialisation, an analysis is carried out of the target PC. The PC identifier is determined—step 140. On HP computers this is achieved by using a simple DOS utility that is able to return the PC model, serial number, or BIOS version on HP Vectra, Kayak or Brio platforms. Such facilities are often provided in modern personal computers to allow software packages to use this information to install the appropriate versions of drivers or hardware-dependent application programs.

In step 150, the hardware of the PC is discovered using a DOS-based program that employs standard plug and play enumeration techniques like those used in the Windows Configuration Manager. As is well known, the term Plug and Play refers to a technology, including associated technical standards, that supports automatic configuration of PC hardware and attached devices. The technology allows a user to attach a new device such as sound or fax card and start working without having to configure the device manually. The technology is implemented by suitable features in hardware in the form of devices that can identify themselves and can be configured via standard software interfaces instead of jumpers or proprietary interfaces, and by suitable features in operating systems such as Microsoft Windows 95, and in supporting software such as drivers and BIOS. An operating system assigns system resources like I/O addresses and IRQs and drivers obtain these resource settings from the operating system.

In personal computer systems designed to operate with the Windows operating systems, any device for one of the more recently standardised expansion buses—such as PCI, EISA, PCMCIA, etc.—is a Plug and Play device.

A key component of Windows 95 is a program called the Configuration Manager that makes use of other programs such as enumerators, arbitrators, device loaders, and device drivers to discover the hardware configuration. Both the Configuration Manager and the enumerators make use of a system-wide binary database known as the registry, that is accessible to the Windows 95 components and applications to store and retrieve information about devices and their drivers, such as possible device configurations, device manufacturer, and the driver revision number. The registry is hierarchically structured, like a tree, with each node being referred to as a key. One or more pieces of data, called values, can be associated with each key. A key can have subkeys, where each subkey is itself a tree with its own values and subkeys.

After checking the hardware, a program checks the presence of the windows operating system itself—step 160—by searching the boot disk, then scanning the msdos.sys file in this boot disk for the windows directory variable. If the result is correct, it sets the environment variables, "winbootdir" and "PATH", with the right value. It also sets the Registry key to read in the "REGKEY" variable. The CurrentVersion Key of the registry is exported in step 170.

The availability of the drivers corresponding to the Hardware detected by the PnP software is checked in step 180. This is done by scanning the database of drivers available on the CD.

Once the hardware has been analysed the user is prompted to indicate whether they want to continue and actually make changes to the software image. If the decision is yes, the drivers and OS kernel files corresponding to the hardware components of the target PC are copied to the correct place, ie the Inf and Cabs directories. The Registry is updated to keep the Network configuration and set the key to the install of the driver. A registry file is created in the Cabs directory containing some keys that will need to be added after the Hardware is configured.

Finally, a executable program—vizir2.exe—that will control the second part of the transition process is copied to the RAM drive.

In step 210, the network parameters—IP Address, IP Mask, IP Gateway, IP Device, WNS Name Server Device, Logon NT Domain, DNS Information, if they exist—are saved to a special key in the registry. The autologon key is set so that hardware installation is automatic. Various other keys are set in the Registry—in step 220—to allow the newly copied drivers to be installed smoothly and for the file vizir2.exe to be automatically executed once the PC is rebooted. The boot on CD facility is disabled to allow the PC to be rebooted from its hard disk. Finally, the PC is rebooted.

Figure 2:
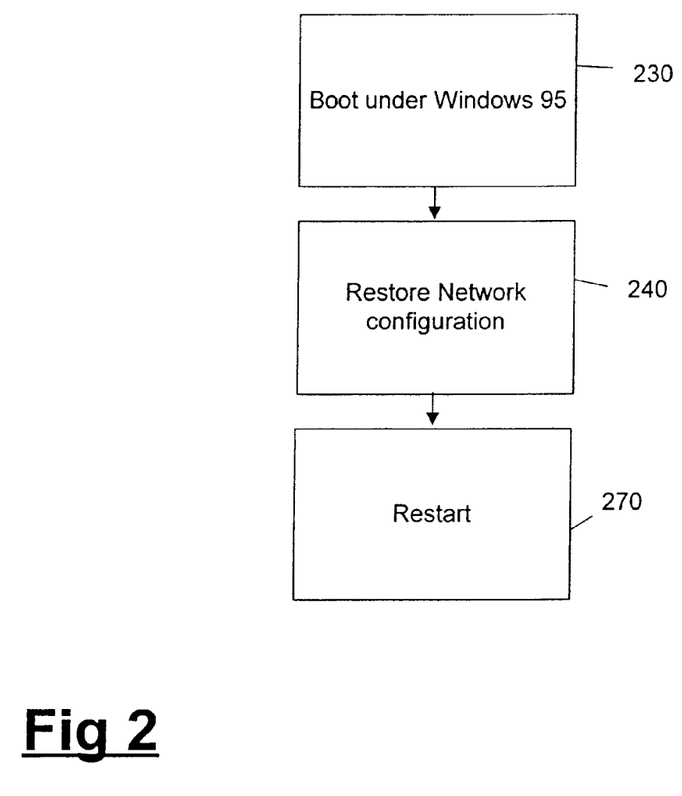
FIG. 2 is a flow diagram showing the second part of the transition process for the tool.

FIG. 2 shows the main steps of the second part of the transition process. In step 230 the computer boots from the Windows 95 OS present on its hard disk and that was cloned from the source machine. As part of this process, the new drivers are automatically installed by the install functionality present in the operating system.

In step 240 the network configuration is restored and the protocols rebound to the NIC present in the target PC.

Finally, the PC is restarted in step 270 and the transition process is complete.

An equivalent software tool will be described for use with the Microsoft NT4 operating system. A difficulty of implementing this kind of tool under Windows NT is that some kind of capability is required that supports automatic configuration of PC hardware and attached devices. The "Plug and Play" technology supported by the Windows 95 and DOS operating systems can be used for this. However, Windows NT does not itself support plug and play functionality and usually a cloned copy of Windows NT will not boot at all on a new hardware configuration. Furthermore, the file system used by Windows NT cannot be used by DOS. It is therefore necessary to find a way of both detecting the hardware present on the machine and processing the disk image without booting Windows NT from the cloned disk.

To achieve this, two bootable operating systems are provided on the bootable CD-ROM. As will be described in more detail below, the first operating system serves to provide an environment for creating a RAM-Drive, detecting the hardware and copying necessary files, including certain Windows NT program files, to the RAM-Drive. The second is a suitably configured copy of Windows NT itself which is configured so that it will boot on the new hardware and permit access to the Windows NT file system in order to make the modifications necessary for the cloned copy of Windows NT to be booted successfully.

The bootable CD includes a bootable partition with MS-DOS; a bootable partition with needed files to boot Windows NT in Phase 2 and a data partition with a directory including the Transition Tool applications and the unattended packages (drivers and utilities) and a directory including Windows files needed during Phase 2 and Phase 3.

As will be described below, a custom DOS driver is provided that serves to restart the machine and to boot Windows NT from the ram-drive. This program serves to capture required interrupt addresses and to actually restart the machine and to boot Windows NT from the Ram-drive disk.

Figure 3:
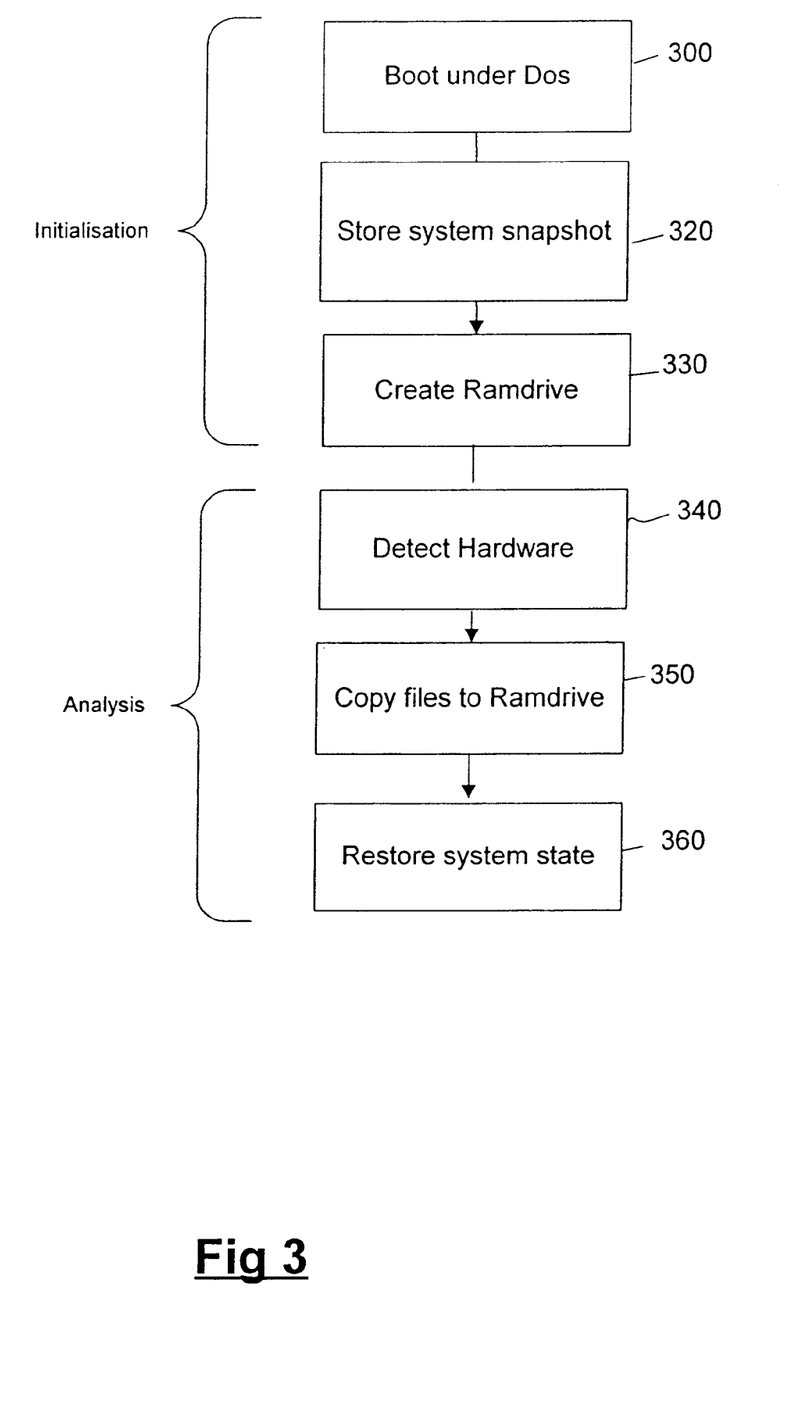
FIG. 3 is a flow diagram showing the main steps of operation of a software tool for use with Windows NT software images.

FIG. 3 is a flow diagram showing the main steps of operation of the software tool.

The OS first launched from the CD is a version of the well known DOS operating system. The first step of the process is therefore the booting of the DOS operating system, shown as step 300.

The very first DOS driver loaded is a custom DOS driver which stores a snapshot of the system at the end of POST in memory. This is shown as step 320. This stored snapshot includes all interrupt vectors, the BIOS data areas (BDA and XBDA), and the states of some critical hardware devices. This information is used later in the process to put the system in a valid state before rebooting.

The next DOS driver loaded is the DOS memory manager (HIMEM.SYS). An option is used to put aside the first half of extended memory. This memory is used later in the process by the next operating system after the reboot. Putting it aside at this stage ensures that a big enough block of contiguous memory will be available for the next operating system.

The next DOS driver to be loaded is the PAM-Drive driver. As is well-known, a PAM-Drive is a portion of RAM that has been configured to simulate a disk drive. Files on a RAM disk can be accessed in the same way as files on a real disk drive. The RAM-Drive is physically allocated in second half of extended memory, after the block put aside by HIMEM.SYS. This is shown as step 330.

Then SCSI and CD-ROM drivers are then loaded. These allow the boot device to be accessed. In other embodiments, suitable network drivers or the like might be loaded to allow access to resources via a network, for instance.

When the DOS initialization is finished, the first stage of the Image Transition itself begins. This first stage is run under DOS. A welcome screen is displayed to warn the user about possible consequences, and get their agreement to continue. Then a full plug and play enumeration of all hardware devices present in the PC is done—step 340. This is done using standard plug and play enumeration techniques, recursively scanning all buses starting from the processor. Additional information is returned by calls to the DMI BIOS.

At this stage, it is not possible to write results to the hard disk, which may not be accessible, if formatted with the NT file system. In consequence, the results of the plug and play analysis are stored in files in the RAM drive.

The next stage consists in preparing the reboot under the next operating system—Windows NT in this embodiment.

Windows NT is a large operating system—too large to boot from a single floppy disk image. What will fit on a single floppy disk image is the NT bootstrap loader, called the "NT loader". Unfortunately, the NT loader does not have support for the CD file system. Furthermore, NT does not support booting from read-only media. So the approach adopted in this embodiment consists in copying an NT kernel from the CD to the RAM Drive—step 150. The RAM Drive is formatted as a DOS FAT drive. And it is writable. The NT kernel includes drivers for all known file systems.

An NT boot floppy, containing the NT Loader, and a customized RAM-Drive driver instead of the normal IDE hard disk driver is contained as the second boot image on the CD.

After all the above steps, a second instance of the custom DOS driver is loaded, which works in cooperation with the first instance loaded earlier in the process. The second instance of the custom DOS driver issues a software interrupt 19*h*. This interrupt is the standard BIOS call for rebooting without running POST.

The last driver to receive the interrupt 19H is the one that was loaded first, that is the first instance of the custom DOS driver. In order to ensure the system is a state from which it can be rebooted, the custom DOS driver uses the stored snapshot of the initial system state, and restores everything to the actual state it was in after POST. This way, it's safe to reboot without running POST again. This is shown as step 360.

In principle, device drivers should respond to interrupt 19h by releasing allocated resources, and returning the system to its initial state. However, in practice many device drivers do not do this. Most drivers have no provision whatsoever for releasing the resources they may have used, and restoring the system to its initial state. That is why it is necessary to have custom DOS driver restore the system to its initial state.

The first instance of the custom DOS driver then transfers control to the second instance. This second instance uses the El Torito API to select the second boot image on the CD, and boot from it—step 370 shown in FIG. 4. The NT loader starts, and proceeds by loading the NT kernel from the RAM-Disk.

Figure 4:
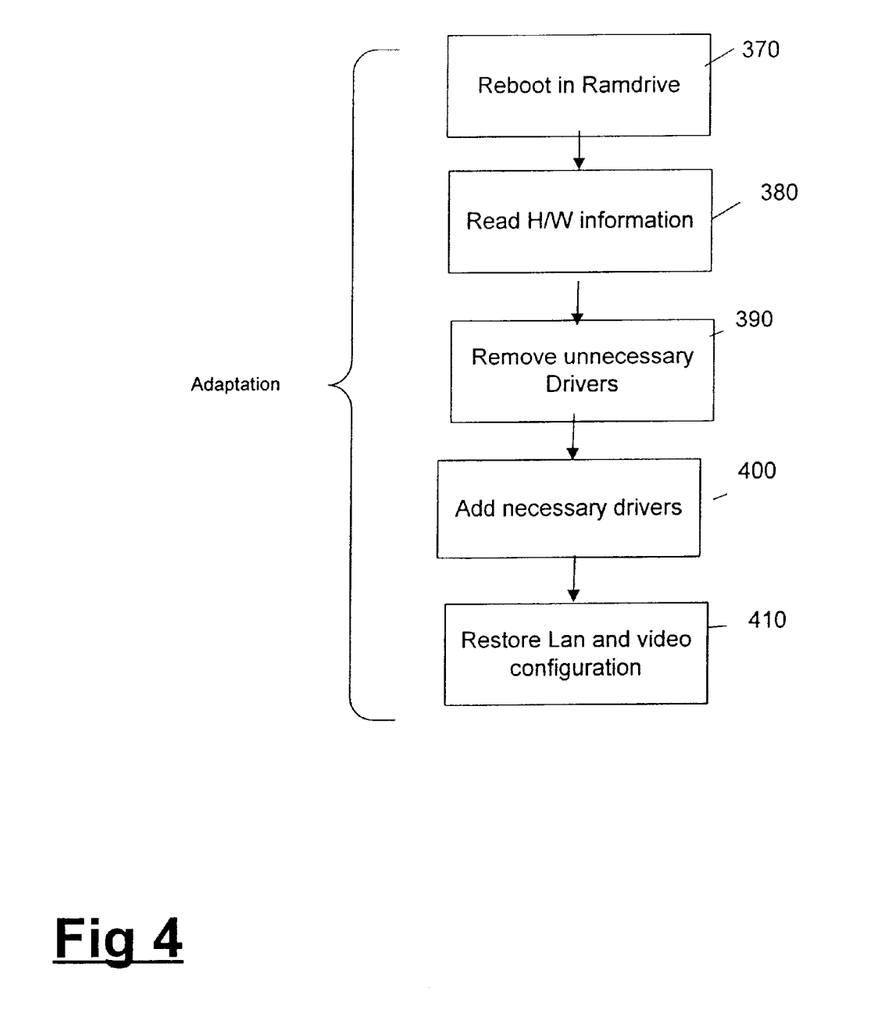
FIG. 4 is a flow diagram showing the second part of the transition process carried out by the tool of FIG. 3.

Once the NT operating system is up and running, the second stage of the Image Transition process begins. The second stage is carried out by a Win32 program run from the CD. All the necessary hardware information is read from the files left by stage 1 in the RAM drive—step 380. Then this information is compared to the database of device drivers on the CD, and the list of necessary drivers is built. These are then installed in phases.

First there's a cleanup phase: The transition program accesses the hard disk, which is now feasible as this instance of NT has drivers for all supported file systems. On the hard disk, it accesses the target operating system's registry. All user settings, such as LAN protocols, video configuration, etc, are saved and all drivers that are NOT necessary for the target PC—step 390 are removed.

Then there's a rebirth phase: It adds the minimal set of drivers necessary for reboot. This is done to limit risks taken by not running the normal driver setup programs. All other necessary drivers setup programs are then copied to the hard disk, and scheduled to run at the next boot—step 400.

Finally, the machine is rebooted on its hard disk for the first time. NT starts. The setup programs for the remaining devices (non boot devices, such as audio, LAN, etc) run. The machine is rebooted a last time, and should then be fully functional. The last task of Image Transition is to restore all user settings, such as LAN protocols, video configuration, etc, to their initial state. This is necessary since many devices setup programs reset the configuration of above software layers to their default value.

Although a specific embodiment of the invention has been described, the invention is not to be limited to the specific arrangement so described. The invention is limited only by the claims. The claims themselves are intended to indicate the periphery of the claimed invention and are intended to be interpreted as broadly as the language itself allows, rather than being interpreted as claiming only the exemplary embodiment disclosed by the specification.

What is claimed is:

1. A software image transition aid for acting on a disk image that is cloned or stored on a storage media that is physically transferred from a source computer to a target computer, the aid comprising: a bootable storage media with stored thereon an operating system arranged to load when the target computer is booted from the storage media and program code elements arranged to modify a cloned or physically transferred disk image under the control of the operating system, so that when the target computer is rebooted from the cloned or physically transferred disk image the target computer will reach an operational state, wherein the program code elements are arranged to:

identify the hardware of the target computer;

the disk image on a hard disk;

identify files to be added to the disk image; and copy the identified files from a repository to the disk image, whereby when the target computer is rebooted from the disk image, an operating system therein finds the required files.

2. A software image transition aid as claimed in claim 1 wherein the bootable media includes a repository of files potentially required for the disk image to be operational in the target computer.

3. A software image transition aid as claimed in claim 1 wherein the code elements for identifying the hardware use Plug and Play enumeration techniques.

4. A software image transition aid as claimed in claim 1 in the form of a single CD.

5. A software image transition aid as claimed in claim 1 wherein the copied files comprise drivers.

6. A software image transition tool as claimed in claim 1 comprising program code elements for creating a ramdrive for storing temporary data used during the transition process.

7. A software image transition tool as claimed in claim 1 comprising program code elements for identifying settable parameters in the disk image; saving the set values of said parameters in storage and restoring said parameters when the disk image has been adapted for use with the target computer.

8. A software image transition tool as claimed in claim 7 wherein the settable parameters are network parameters.

9. A software image transition aid as claimed in claim 1 wherein the bootable media is provided with first and second operating systems and program elements arranged to:

boot the first operating system from the bootable media, reserve an area of memory and perform a first task under the control of said first operating system;

store results generated by said first task in the reserved memory area;

reboot the computer so as to load a second operating system from the bootable media; and perform under the control of the second operating system a second task using the stored results.

10. A software image transition aid as claimed in claim 9 wherein booting the first operating system includes performing a power-on self test (POST), the arrangement comprising program elements for saving an initial system state after the POST and, prior to the reboot, restoring the system state as it was saved following the POST.

11. A software image transition aid for acting on a disk image that is cloned or stored on a storage media that is physically transferred from a source computer to a target computer, the aid comprising: a bootable storage media with stored thereon a first operating system arranged to load when the target computer is booted from the storage media and program code elements arranged to:

identify the hardware of the target computer;

the disk image on a hard disk;

identify files to be added to the disk image; and copy the identified files from a repository to the disk image, whereby when the target computer is rebooted from the disk image, a second operating system therein finds the required files and is able to reach an operational state.

12. A software image transition aid as claimed in claim 11 wherein the bootable media includes a repository of files potentially required for the disk image to be operational in the target computer.

13. A software image transition aid as claimed in claim 11 wherein the code elements for identifying the hardware use Plug and Play enumeration techniques.

14. A software image transition aid for acting on a disk image that is cloned or stored on a storage media that is physically transferred from a source computer to a target computer, the aid comprising: a bootable storage media with stored thereon an operating system arranged to load when the target computer is booted from the storage media; a repository of files potentially required for the disk image to be operational in the target computer; and program code elements arranged to:

identify the hardware of the target computer using Plug and Play enumeration techniques;

the disk image on a hard disk;

identify files to be added to the disk image; and copy the identified files from a repository to the disk image, whereby when the target computer is rebooted from the disk image, an operating system therein finds the required files.

15. A software image transition aid as claimed in claim 14 in the form of a single CD.

16. A software image transition tool as claimed in claim 14 comprising program code elements for identifying settable parameters in the disk image; saving the set values of said parameters in storage and restoring said parameters when the disk image has been adapted for use with the target computer.

17. A software image transition tool as claimed in claim 16 wherein the settable parameters are network parameters.

18. A tool in the form of a single CD for acting on a disk image that is cloned or stored on a storage media that is physically transferred from a source computer to a target computer, the aid comprising: a bootable storage media with stored thereon an operating system arranged to load when the target computer is booted from the storage media; a repository of files potentially required for the disk image to be operational in the target computer; and program code elements arranged to:

identify the hardware of the target computer using Plug and Play enumeration techniques;

the disk image on a hard disk;

identify files to be added to the disk image; and copy the identified files from a repository to the disk image, whereby when the target computer is rebooted from the disk image, an operating system therein finds the required files.

19. A tool as claimed in claim 18 comprising program code elements for identifying settable parameters in the disk image; saving the set values of said parameters in storage and restoring said parameters when the disk image has been adapted for use with the target computer.

20. A tool as claimed in claim 19 wherein the settable parameters comprise network parameters.

21. A software image transition aid for acting on a first storage media that is physically transferred from a source computer to a target computer, said first storage media including a first operating system that is bootable on said source computer, the aid comprising: a second bootable storage media with stored thereon a second operating system arranged to load when the target computer is booted from the second storage media and program code elements arranged to:

identify the hardware of the target computer;

the first storage media;

identify required files to be added to a disk image; and copy the identified required files from a repository to the first storage media, whereby when the target computer is rebooted from the first storage media, the first operating system therein finds the required files and is able to reach an operational state.

22. A software image transition aid for acting on a cloned data image that is copied from a source computer to a target computer, said cloned data image being bootable on said source computer and including a first operating system, the aid comprising: a bootable storage media with stored thereon a second operating system arranged to load when the target computer is booted from the second storage media and program code elements arranged to:

identify the hardware of the target computer;

the cloned data image;

identify required files to be added to the cloned data image; and copy the identified required files from a repository to the cloned data image, whereby when the target computer is rebooted from the cloned data image, the first operating system therein finds the required files and is able to reach an operational state.

* * * * *

UNITED STATES PATENT AND TRADEMARK OFFICE
CERTIFICATE OF CORRECTION

PATENT NO. : 6,804,774 B1
DATED : October 12, 2004
INVENTOR(S) : Jean-Francois Lavoire et al.

It is certified that error appears in the above-identified patent and that said Letters Patent is hereby corrected as shown below:

Column 7,
Line 67, change "the disk image on a hard disk" to -- analyse the disk image on a hard disk --

Column 8,
Line 57, change "the disk image on a hard disk" to -- analyse the disk image on a hard disk --

Column 9,
Lines 16 and 142, change "the disk image on a hard disk" to -- analyse the disk image on a hard disk --

Column 10,
Line 20, change "the first storage media" to -- analyse the first storage media --
Line 20, change "the cloned data image" to -- analyse the cloned data image --

Signed and Sealed this

Second Day of August, 2005

JON W. DUDAS
*Director of the United States Patent and Trademark Office*